(12) United States Patent
Han

(10) Patent No.: US 10,367,732 B2
(45) Date of Patent: Jul. 30, 2019

(54) ROUTE CONTROL FOR INTERNET EXCHANGE POINT

(71) Applicant: Futurewei Technologies, Inc., Plano, TX (US)

(72) Inventor: Lin Han, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 122 days.

(21) Appl. No.: 14/971,974

(22) Filed: Dec. 16, 2015

(65) Prior Publication Data

US 2016/0182371 A1  Jun. 23, 2016

Related U.S. Application Data

(60) Provisional application No. 62/093,150, filed on Dec. 17, 2014.

(51) Int. Cl.
*H04L 12/741* (2013.01)
*H04L 12/715* (2013.01)
*H04L 12/751* (2013.01)

(52) U.S. Cl.
CPC .............. *H04L 45/74* (2013.01); *H04L 45/02* (2013.01); *H04L 45/04* (2013.01)

(58) Field of Classification Search
CPC .......... H04L 45/74; H04L 45/04; H04L 45/02
See application file for complete search history.

(56) References Cited

U.S. PATENT DOCUMENTS

| | | | | |
|---|---|---|---|---|
| 7,787,396 B1* | 8/2010 | Nalawade | ............... | H04L 45/02 370/254 |
| 7,990,893 B1* | 8/2011 | Singh | ..................... | H04L 45/74 370/254 |
| 8,937,961 B1* | 1/2015 | Vairavakkalai | ......... | H04L 45/02 370/401 |

(Continued)

FOREIGN PATENT DOCUMENTS

| | | |
|---|---|---|
| CN | 101473605 A | 7/2009 |
| WO | 2003013055 A2 | 1/2003 |

OTHER PUBLICATIONS

Jasinska, et al. "Internet Exchange Route Server", draft-ietf-idr-ix-bgp-route-server-06, Dec. 10, 2014.*

*Primary Examiner* — Kwang B Yao
*Assistant Examiner* — Moo Jeong
(74) *Attorney, Agent, or Firm* — Jinghua Karen Tang

(57) ABSTRACT

A server implements a method for sending routing information in an Internet exchange point (IXP) network. The server receives control information from a first IXP member via the IXP network and obtains first routing information from the first IXP member via the IXP network, where the control information comprises an identifier of a second IXP member. Based on the first routing information and the control information, the server generates second routing information for the second IXP member, where the second routing information may be identical to the first routing information or a portion of the second IXP member. After the generation, the server sends the second routing information to the second IXP member. With the second routing information, the second IXP member may obtain some routing capability of the first IXP member.

20 Claims, 6 Drawing Sheets

(56) References Cited

U.S. PATENT DOCUMENTS

2003/0023701 A1\* 1/2003 Norman .................. H04L 45/00
 709/214
2009/0190583 A1 7/2009 Accetta et al.
2010/0128633 A1 5/2010 Balachander et al.
2010/0128729 A1 5/2010 Takeki et al.
2013/0117449 A1\* 5/2013 Hares ...................... H04L 29/06
 709/225

\* cited by examiner

300

ROUTE CONTROL FOR INTERNET EXCHANGE POINT

CROSS-REFERENCE TO RELATED APPLICATIONS

The present application claims priority to U.S. Provisional Patent Application No. 62/093,150 filed Dec. 17, 2014 by Lin Han and titled "Outbound Route Filtering for Internet Exchange Point," which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Internet exchange point (IXP) is a physical infrastructure through which network providers connect their networks and exchange traffic. The network providers that exchange traffic at an IXP are referred to as the IXP members. Some examples of network providers may include Internet service providers (ISPs) and enterprises. Each provider network may be referred to as an autonomous system (AS), which operates under a single administrative entity with well-defined routing policy. The AS may have the meaning given in RFC4271. An IXP may be referred to as an IXP network and it may connect a plurality of IXP members' routers together for routing information exchange. IXP networks may operate in either layer 2 (L2) or layer 3 (L3) of an open system interconnection (OSI) model, where L2 refers to the data link layer and L3 refers to the network layer in the OSI model. Border gateway protocol (BGP) as described in the Request for Comment (RFC) 4271, which is incorporated herein by reference, may be used to enable IXP members to exchange routing and reachability information. The IXP members are also referred to as peers when the IXP members agree to exchange traffic in the IXP network.

SUMMARY

In an embodiment, the disclosure includes a method implemented in a server at an Internet exchange point (IXP) network comprising receiving first control information in a first message from a first IXP member via the IXP network, where the first control information comprises an identifier of a second IXP member, obtaining first routing information from the first IXP member via the IXP network, generating second routing information based on the first control information and the first routing information, and sending the second routing information to the second IXP member.

In another embodiment, the disclosure includes a network element (NE) comprising a memory storage comprising computer-executable instructions and a processor coupled to the memory storage. The processor is configured to execute the instructions to: receive first control information in a first message from a first IXP member via an IXP network, where the first control information comprises an identifier of a second IXP member, obtain first routing information from the first IXP member via the IXP network, generate second routing information based on the first control information and the first routing information, and send the second routing information to the second IXP member.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
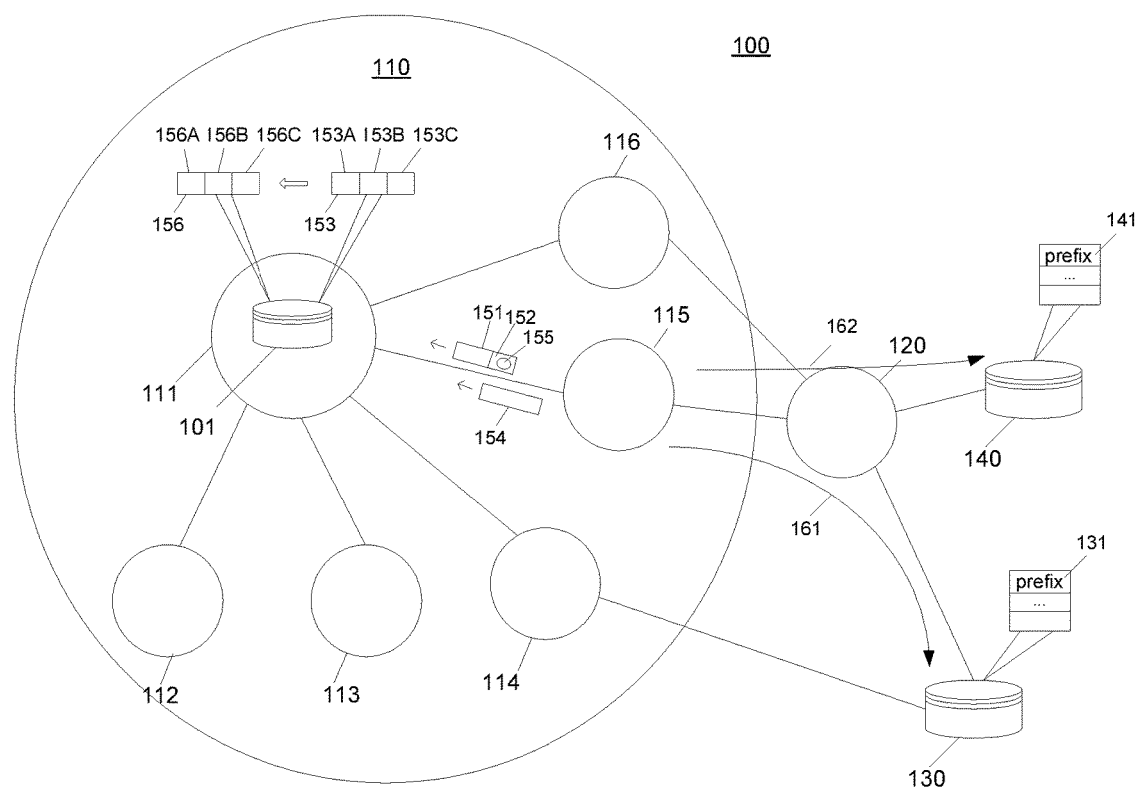
FIG. 1 is a schematic diagram illustrating a network according to an embodiment of the disclosure.

FIG. 1 is a schematic diagram illustrating a network 100 according to an embodiment of the disclosure. The network 100 includes an IXP network 110, an AS 120 and two servers 130 and 140, where the AS 120 and the two servers 130 and 140 are outside the IXP network 110. The IXP network 110 includes AS 111, AS 112, AS 113, AS 114, AS 115, and AS 116. AS 111 includes a server 101. As shown in FIG. 1, AS 112, AS 113, AS 114, AS 115 and AS 116 of IXP network 110 may be coupled together by the server 101 in AS 111 for routing information exchange. Full mesh connection is not needed among these ASes for routing information exchange. AS 112, AS 113, AS 114, AS 115 and AS 116 may be referred to as IXP member 112, IXP member 113, IXP member 114, IXP member 115 and IXP member 116, respectively. Neither server 101 nor AS 111 is an IXP member. Because the server 101 is configured to be coupled to the IXP members in IXP network 110 for traffic exchange, it is also referred to as an IXP server 101. Each of servers 130 and 140 is assigned one or more prefixes (e.g., prefixes 1310 and 1410). Each prefix may cover one or more IP addresses which associate with internet services, such as a website. For example, the one or more IP address may include an IP address of website such as Google, Netflix or other similar service and/or content provider. Servers 130 and 140 may be deployed by the service and/or content provider or deployed by some Internet operator, such as AT&T and Verizon. As a prefix includes at least one IP address, it may also be referred to as IP prefix.

The IXP network 110 may be configured to provide a backbone hub for different IXP members to exchange L2 or L3 data traffic. The data traffic exchange among the IXP members may be referred to as peering. Each IXP member in IXP network 110 may be coupled to any other IXP member(s) in IXP network 110. In one embodiment, IXP network 110 may be an Ethernet local area network (LAN) having a plurality of Ethernet switches. In another embodiment, IXP network 110 may be an IP LAN having a plurality of L3 switches and routers. Each IXP member in IXP network 110 may have multiple border devices, such as border switches or routers. An IXP member in IXP network 110, via its associated border devices, may be coupled to other IXP members in IXP network 110 and/or other ASes or servers outside IXP network 110.

In one embodiment, IXP member 115 may send one or more messages 154 and a message 151 to server 101. The one or more messages 154 includes routing information 153, which includes destination address information 153A, next hop 153B and may further include AS path information 153C. Destination address information 153A may include one or more prefix (e.g., prefix 131 and/or prefix 141) and next hop 153B may include an IP address of network node in IXP member 115. In this situation, destination address information 153A and next hop 153B indicates that if a packet needs to be routed to an IP address covered by destination address information 153A (e.g., prefix 131 and/or prefix 141), the packet may be routed to the network node identified by next hop 153B. The network node identified by next hop 153B will then route the packet to its destination. When a network node receives destination address information 153A, next hop 153B and needs to a packet whose destination is covered by destination address information 153A, the network node will send the packet to the network node identified by next hop 153B. AS path information 153C includes one or more AS paths, each of which corresponds to a prefix in destination address information 153A. For example, when destination address information 153A includes prefixes 131 and 141, AS path information 153C includes AS path 161, which is from AS 115 to server 130, and AS path 162, which is from AS 115 to server 140. AS path 161 corresponds to prefix 131 and AS path 162 corresponds to prefix 141. The message 151 may include an IXP ORF entry 152, which includes control information 155. Control information 155 instructs server 101 to generate routing information 156.

Routing information 156 may have the same or a portion of structure as routing information 153. In routing information 156, next hop 156B may be identical to destination address information 153A and next hop 153B. Depending on control information 155, destination address information 156A may be identical to destination address information 153A (e.g., prefixes 131 and 141) or a portion of destination address information 153A (e.g., prefix 131 and prefix 141). AS path information 156C may or may not be included in routing information 156, when routing information 153 includes AS path information 153C. AS path information 156C may include AS path corresponding to destination address information 156A. For example, when destination address information 156A includes prefix 131, AS path information 156C includes AS path 161, when destination address information 156A includes prefixes 131 and 141, AS path information 156C includes AS path 161 and AS path 162.

Control information 155 may instruct server 101 generate same routing information 156 for multiple IXP members (e.g., AS 112 and AS 113). Control information 155 may also generate different routing information for different IXP members. For example, server 101 generates routing information 156 for IXP member 112 and generates routing information different from routing information 156 for IXP member 113. The routing information for IXP member 113 may have same or similar structure as routing information 156. After routing information corresponding to one or more IXP members is generated, server 101 sends each of the one or more IXP members corresponding routing information. In an example, destination address information in routing information 156 may include prefix 131, destination address information in the routing information generated for IXP member 113 may include prefix 141. A next hop in the routing information generated for IXP member 113 is identical to next hop 156B in routing information 156.

Figure 2:
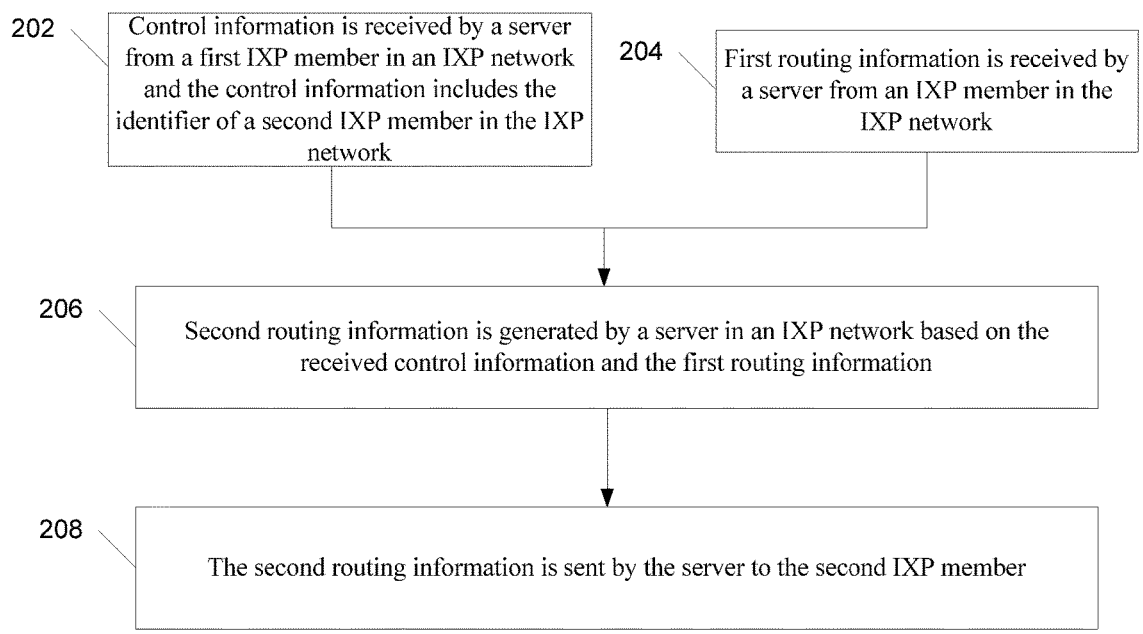
FIG. 2 is a flowchart of a method for sending routing information according to an embodiment of the disclosure.

FIG. 2 is a flowchart illustrating a method for sending routing information according to an embodiment of the disclosure.

At operation 202, control information is received by a server from a first IXP member in an IXP network and the control information includes the identifier of a second IXP member in the IXP network. For example, server 111 of IXP network 110, as shown in FIG. 1, may receive control information 155 in a message 151 from an IXP member 115 via IXP network 110, where the control information 155 includes the identifier of IXP member 112. Message 151 may be a BGP ROUTE-REFRESH message as defined in RFC 5291. Control information 155 may be carried in a new or extended IXP ORF entry 152 in the message 151.

At operation 204, first routing information is received by the server from an IXP member in the IXP network. In one example, server 101 obtains routing information 153 from IXP member 115 via IXP network 110. The first routing information is associated with the IXP member. For example, routing information 153 includes a prefix and routing information 153 is used to indicate that the IXP member 115 is capable of routing packets to a destination identified by prefix carried in routing information 153.

In some embodiments, server 101 may receive routing information 153 before or as the same time as receiving control information 155. IXP member 115 may send one or more BGP UPDATE messages 154 as defined in RFC 4271 to server 101. Based on the BGP UPDATE messages 154, server 101 may obtain the routing information 153 that includes destination address information 153A, next hop 153B and AS path information 153C. The destination address information 153A may be one or more IP prefixes associated with IXP member 115, such as prefixes 131 and 132 as illustrated in FIG. 1. When an IP prefix (e.g., prefix 131) is associated with an IXP member (e.g., IXP member 115), the IXP member is capable send a packet whose destination address is covered by the prefix (e.g., prefix 131) to its destination (e.g., server 130). Next hop 153B may be an IP address assigned for IXP member 115, such as an IP address assigned for a router in IXP member 115. AS path information 153C may include one or more AS paths which couple the IXP member 115 with one or more external network node (e.g., server 130 and server 140) for which the destination address information (e.g., prefix 131 or prefix 132) is assigned. For example, AS path 161 may start from AS 115 and end at server 130, via AS 120, AS path 162 may start from AS 115 and end at server 140, via AS 120.

Figure 3:
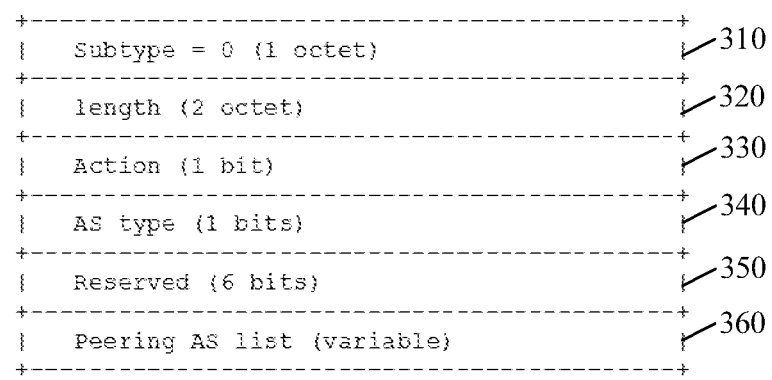
FIG. 3 is a schematic diagram of an AS-based IXP ORF entry according to an embodiment of the disclosure.
Figure 4:
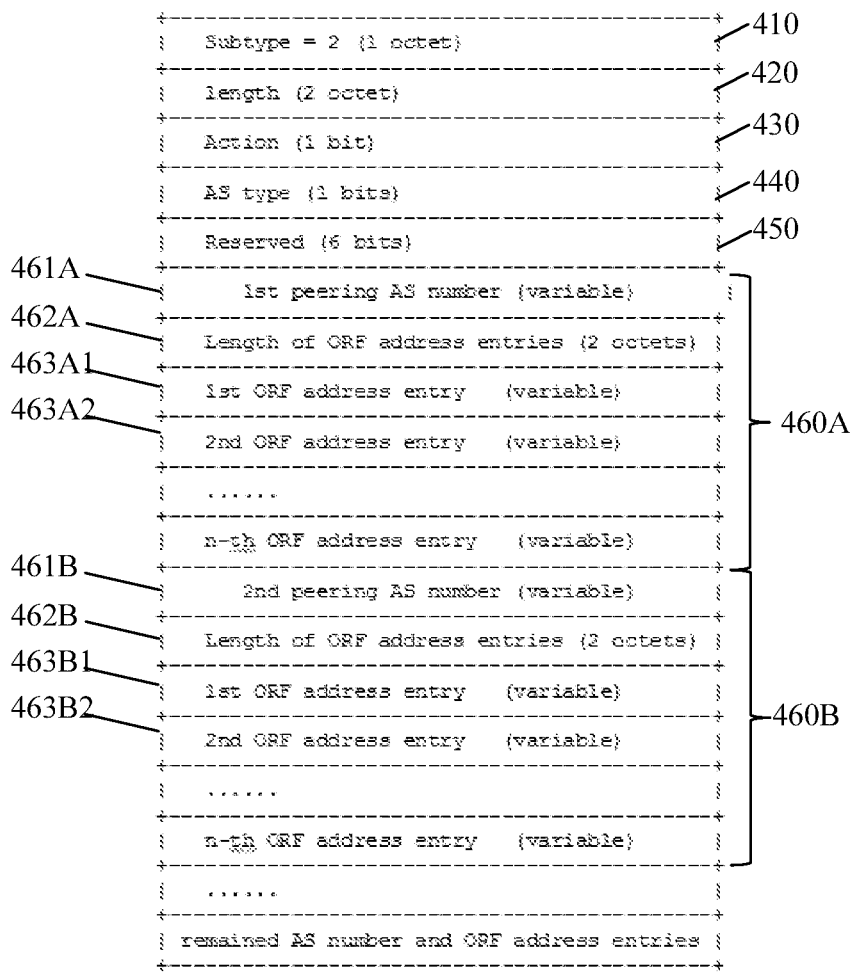
FIG. 4 is a schematic diagram of an AS-Prefix-based IXP ORF entry according to an embodiment of the disclosure.

At operation 206, second routing information is generated by a server in an IXP network based on the received control information and the first routing information. For example, server 101 may generate second routing information 156 based on the received control information 155 and first routing information 153. When control information 155 is AS-based control information, second routing information 156 may be identical to first routing information 153. When control information 155 is the AS-based control information, the IXP ORF entry 152 may be as illustrated in FIG. 3. When control information 155 is AS-Prefix-based control information, routing information 156 may be a portion of first routing information 153. In one embodiment, in first routing information 153, destination address information 153A includes prefixes 131 and 141 where prefix 131 is a prefix assigned for server 130 and prefix 141 is a prefix assigned for server 140, next hop 153B includes an IP address of IXP member 115, and AS path information 153C includes two paths: path 161 and path 162, where path 161 starts from IXP member 115, passes through AS 120, and ends at the server 130, and path 162 starts from IXP member 115, passes through AS 120, and ends at the server 140. In one example, the control information 155 includes one of the two prefixes 131 and 141, and an identifier of IXP member 112. As such, second routing information 156 may include the prefix 131 in control information 155 as the destination address information 156A, include next hop 153B of first routing information 153 as next hop 156B, and include AS path 161 (e.g., IXP member 115-AS 120-server 130) associated with the prefix 131 as AS path information 156C. In some embodiments, second routing information 156 may not include AS path information 156C. When control information 155 is AS-Prefix-based control information, control information 155 may be shown in the form of IXP ORF entry 152, as illustrated in FIG. 4.

At operation 208, the second routing information is sent by the server to the second IXP member. In one embodiment, server 101 sends second routing information 156 to IXP member 112. With second routing information 156, IXP member 112 may send a packet with a destination address identified by destination address information 156A (e.g., prefix 131) to IXP member 115, which will further routes this packet to server 130. A method for sending routing information may be advertising the routing information.

As stated above, IXP member 115 may send part or all of first routing information to an IXP member specified by the IXP member 115, instead of publishing the routing information of IXP member 115 to all IXP members in IXP network 110.

FIG. 3 is a schematic diagram of an AS-based IXP ORF entry 300 according to an embodiment of the disclosure. In one embodiment, AS-based control information 155 may be utilized in the form of ORF entry 300. As shown in FIG. 3, ORF entry 300 includes a subtype field 310, a length field 320, an action field 330, an AS type field 340, a reserved field 350, and a peering AS list field 360. Subtype field 310 may be one octet long and may be set to a value of zero. Length field 320 may be two octets long and may be used to store the length of ORF entry 300. Action field 330 may be one bit long and is used to instruct IXP server 101 to perform appropriate action. The appropriate action may include sending second routing information 156 to each IXP member identified by Peering AS list field 360. Because ORF entry 300 is used to send routing information at AS level, ORF entry 300 does not include filtering condition that is used to determine second routing information 156, based on the first routing information 153. Therefore, second routing information 156 may be identical to first routing information 153 when the AS-based control information is applied to generate the second routing information. AS type field 340 may be about one bit long. For example, AS type field 340 is set to a value of zero to indicate a two-octet AS number format and a value of one to indicate a four-octet AS number format. Reserved field 350 may be about 6 bits long and is reserved for future usage. Peering AS list field 360 is a variable length field and is used to store one or more AS numbers, to which server 101 may send routing information (e.g., second routing information 156).

When a server (e.g., server 101) receives a message, such as a ROUTE-REFRESH message, carrying an ORF entry 300 having action field 330 from IXP member 115, action field 330 in ORF entry 300 is set to a value instructing the server 101 to send second routing information 156 that is identical to first routing information 153 to each IXP members identified in peering AS list field 360, such as IXP members 112, 113, and 114. In one example, the server 101 receives a message, such as a ROUTE-REFRESH message, carrying ORF entry 300 from IXP member 115, where action field 330 is set to zero and peering AS list field 360 includes the identifiers of IXP members 112 and 113. Based on the message, the server 101 sends first routing information 153 obtained from IXP member 115 to IXP members 112 and 113. Because peering AS list field 360 does not include IXP members 114 and 116, first routing information 153 is not sent by server 101 to IXP members 114 and 116.

FIG. 4 is a schematic diagram of an AS-Prefix-based IXP ORF entry 400 according to an embodiment of the disclosure. In one embodiment, ORF entry 400 is used to carry the AS-Prefix-based control information. As discussed above with respect to FIG. 3, entry 300 may be used to carry a message, such as a ROUTE-REFRESH message as described in RFC 2918. ORF entry 400 may be employed by an IXP member (e.g., IXP member 115) to send routing information at a more granularity level than AS level.

ORF entry 400 includes a subtype field 410, a length field 420, an action field 430, an AS type field 440, a reserved field 450, and one or more address groups 460. Subtype field 410, length field 420, AS type field 440, and reserved field 450 of ORF entry 400 are similar to or the same as subtype field 310, length field 320, AS type field 340, and reserved field 350 of entry 300 shown in FIG. 3, respectively. Action field 430 of ORF entry 400 may be used to instruct an IXP server (e.g., server 101) to filter routing information (e.g., first routing information 153) for one or more IXP members in an IXP network respectively and then send each filtered routing information to its corresponding IXP member.

Each address group 460 (e.g., 460A) includes an AS number field 461 (e.g., 461A), a length field 462 (e.g., 462A), and one or more of ORF address fields 463 (e.g., 463A1 and 463A2). A number field 461 (e.g., 461A) comprises a variable length depending on AS type field 440. AS number field 461 (e.g., 461A) identifies an AS that a server may peer with for sending routing information. Length field 462 (e.g., 462A) may be two octets long and may be used to indicate the length of the ORF address fields 463 (e.g., 463A1 and 463A2). Each ORF address field 463 (e.g., 463A1 or 463A2) is a variable length field and may be encoded according to RFC 5292. Because a variable length field may be referred to as an entry, each ORF address field may be referred to as an ORF address entry. Each ORF address field 463 (e.g., 463A1 or 463A2) may include an IP prefix, which indicates a group of IP addresses or only one IP address.

In one embodiment, ORF entry 400 has two address groups: address group 460A and address group 460B. Address group 460A includes a peering AS number 461A, a length field 462A and two ORF address fields 463A1 and 463A2. Peering AS number 461A includes an AS number of IXP member 112. Length field 462A indicates the length of ORF address field 463A which comprising ORF address fields 463A1 and 463A2. ORF address field 463A1 includes prefix 131, ORF address field 463A2 includes prefix 141. Address group 460B includes a peering AS number 461B, a length field 462B and one ORF address field 463B1. Peering AS number 461B includes an AS number of IXP member 113. Length field 462B indicates the length of ORF address field 463B1. ORF address field 463B1 includes prefix 131.

In one embodiment, upon receiving above ORF entry 400 with address group 460A and address group 460B, based on the AS number of IXP 112 that is included in peering AS number 461A, server 101 may send first filtered routing information to IXP member 112. The first filtered routing information may be identical to first routing information 153. Based on the AS number of IXP member 113 that is included in peering AS number 461B, server 101 may send second filtered routing information to IXP member 113. Destination address information in the second filtered routing information includes prefix 131, but does not include prefix 141. A next hop in the second filtered routing information is the same as the next hop in the routing information 153. AS path information in the filtered routing information may be used to indicate a path that starts from IXP member 115, passes AS 120, and ends at server 130.

Figure 5:
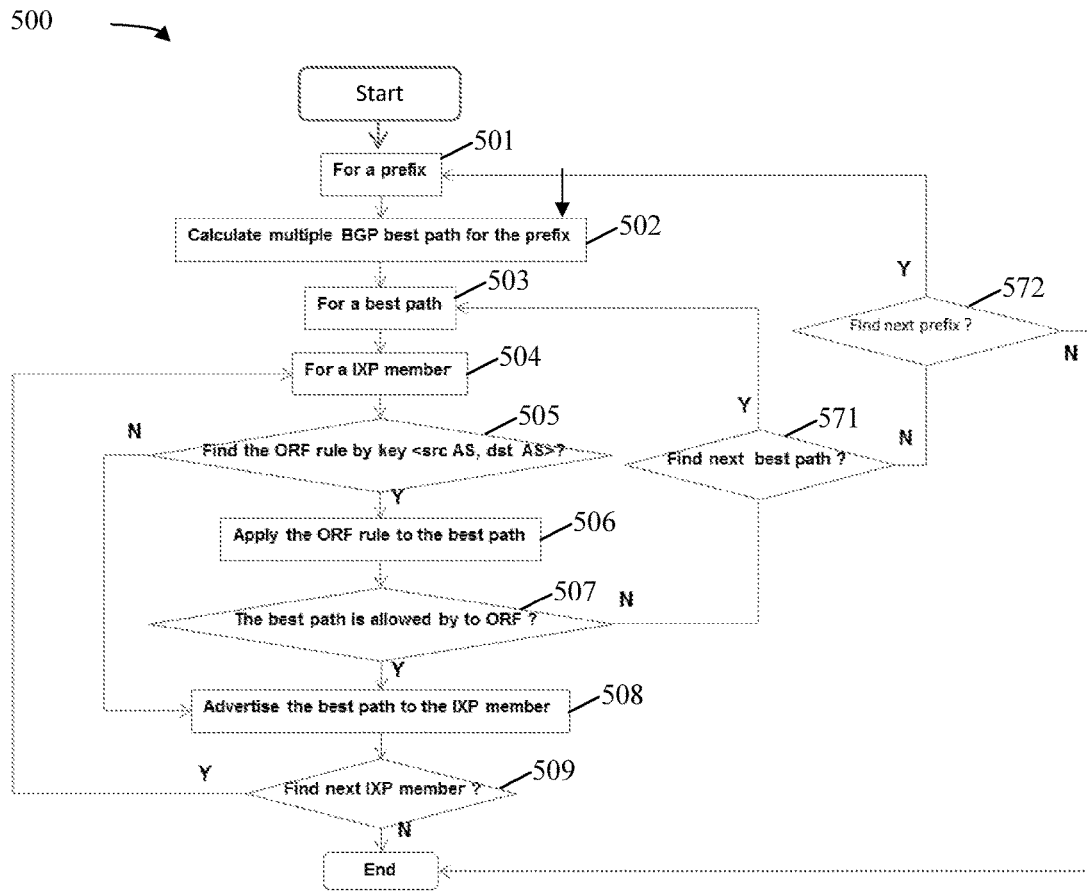
FIG. 5 is a flowchart of a method for sending routing information according to an embodiment of the disclosure.

FIG. 5 is a flowchart illustrating a method 500 for sending routing information based on received control information according to an embodiment of the disclosure. In one embodiment, the method 500 is implemented in a server (e.g., server 101 in FIG. 1) in an IXP network. The server may receive routing information associated with each IXP member (e.g., the IXP members 112-116 of IXP network 101). In one example, the routing information associated with one IXP member may be received via BGP UPDATE messages as described in RFC 4271. The routing information has destination address information, which includes one or more IP prefixes.

When a prefix is associated with an IXP member, the IXP member may route a packet whose destination address is covered by the prefix to the destination identified by the destination address. The server may also receive messages, such as ROUTE-REFRESH messages from IXP members. Each of the messages carries an ORF entry (e.g., the ORF entry 300 or the ORF entry 400) comprising control information. In one embodiment, method 500 begins after the server (e.g., server 101) receives control information and obtains routing information from two or more IXP members (e.g. IXP member 114, 115 and 116).

At operation 501, a prefix (e.g., prefix 131), is selected by a server (e.g., server 101) in an IXP network (e.g., IXP network 110). The prefix is associate with two or more IXP members in the IXP network. When a prefix is associated with an IXP member, the IXP member is capable of routing packets to this prefix, instead of routing the packets to a default gateway of the IXP member. For example, when prefix 131 is associated with IXP members 114, 115 and 116, each of IXP members 114, 115 and 116 may route a packet to prefix 131 to server 130. At operation 502, multiple preferred BGP paths to the selected prefix (e.g., prefix 131) are calculated by the server (e.g., server 101). A path to a prefix may refer to a path to a network node for which the prefix is assigned. For example, as illustrated in FIG. 1, a path to prefix 131 is a path to server 130. The multiple preferred BGP paths may be referred to as multiple best BGP paths or multiple best paths. The multiple preferred BGP paths may be paths with high priority in a plurality of potential BGP paths.

In one embodiment, IXP member 114 informs server 101, by sending routing information to server 101, that IXP member 114 is capable of routing packets to prefix 131. Furthermore, IXP members 115 and 116 also respectively inform server 101 that they are capable of routing packets to prefix 131. Then three potential paths to prefix 131 would be calculated by server 101. A first potential path may be from server 101 to IXP member 115, a second potential path may be from server 101 to IXP member 114, and a third potential path may be from server 101 to IXP 116. Server 101 may determine that the first path has the highest priority among the three potential BGP paths. Consequently, the first path is determined as a preferred BGP path. Server 101 may take the first path out of the three potential BGP paths to get two potential paths. Furthermore, server 101 may determine the second path has the highest priority among the two potential BGP paths, which includes the second and the third paths. Then, the second path is determined as another preferred BGP path. Although both the first path and the second path are preferred BGP paths, the first path has higher priority than the second path has. In one embodiment, the preferred BGP paths may also be randomly selected from multiple potential BGP paths. In another embodiment, all the potential paths may be determined as the preferred BGP paths.

At operation 503, a preferred BGP path with the highest priority (e.g., the first path) is selected from a pool including all the preferred BGP paths.

At operation 504, a first IXP member (e.g., IXM member 112) is selected. The selected IXP member is not on the preferred BGP path selected at operation 503. For example, when the first path is selected at operation 503, the first IXP member selected at operation 504 may be IXM member 112 or 113, but not IXM member 115.

At operation 505, the server (e.g., server 101) determines whether there is first control information, which is used to control sending the first IXP member (e.g., IXP member 112) routing information obtained from a source IXP member. The source IXP member (e.g., IXP member 115) is on the path selected at operation 503. In one embodiment, when the first IXP member is IXP member 112 and the source IXP member is IXP member 115, the first control information may include a source IXP number and a destination IXP number, where the source IXP number is number of the source IXP member and the destination IXP number is number of first IXP member.

When the server has the first control information, the method proceeds to 506; when the IXP server does not have the first control information, the method proceeds to 508.

At operation 506, the first control information is applied to control sending the first IXP member the routing information to the prefix selected at operation 501. Although the first control information may be obtained by the server (e.g., server 101) before operation 501, the first control information may not be applied by the IXP server to control sending the first IXP member the routing information to the prefix selected at operation 501.

At operation 507, based on the applied first control information, the IXP server determines whether first routing information to the prefix (e.g. prefix 131) selected at 501, may be sent to the selected IXP member. The first routing information to the prefix (e.g. prefix 131) selected at operation 501 may include the prefix (e.g. prefix 131) selected at operation 501 as a destination address and also include a next hop, where the next hop is an IP address assigned for a router in an IXP member on the preferred BGP path selected at operation 503. When the applied first control information permits the first routing information to be sent to IXP member selected at operation 504, the method proceeds to operation 508; otherwise, the method proceeds to operation 507.

At operation 508, the first routing information is sent to the IXP member (e.g., IXP member 112) selected at operation 504. As such, the IXP member (e.g., IXP member 112) selected at operation 504 obtains the first routing information. Therefore, the IXP member (e.g., IXP member 112) selected at operation 504 may route a packet with an IP address identified by the prefix (e.g., prefix 131) selected at operation 501 to the IXP member (e.g., IXP member 115) on the preferred BGP path selected at operation 503. Then, the IXP member (e.g., IXP member 115) on the preferred BGP path selected at operation 503 may further route the packet to its destination.

At operation 509, the server (e.g., server 101) determines whether the first routing information needs to be sent to a next IXP member. When there is the next IXP member in the IXP network, the method 500 goes back to operation 504; when the next IXP member doesn't exist in the IXP network, the method 500 ends.

At operation 571, the server (e.g., server 101) determines whether a next preferred BGP path to the prefix needs to be found. When the next preferred BGP path to the prefix needs to be found, the method 500 proceeds back to operation 503; otherwise, the method 500 proceeds to operation 572.

At operation 572, the server (e.g., server 101) determines whether it is needed to select a next prefix. When it is needed to select a next prefix, the method 500 proceeds to operation 501; otherwise, the method 500 ends.

Figure 6:
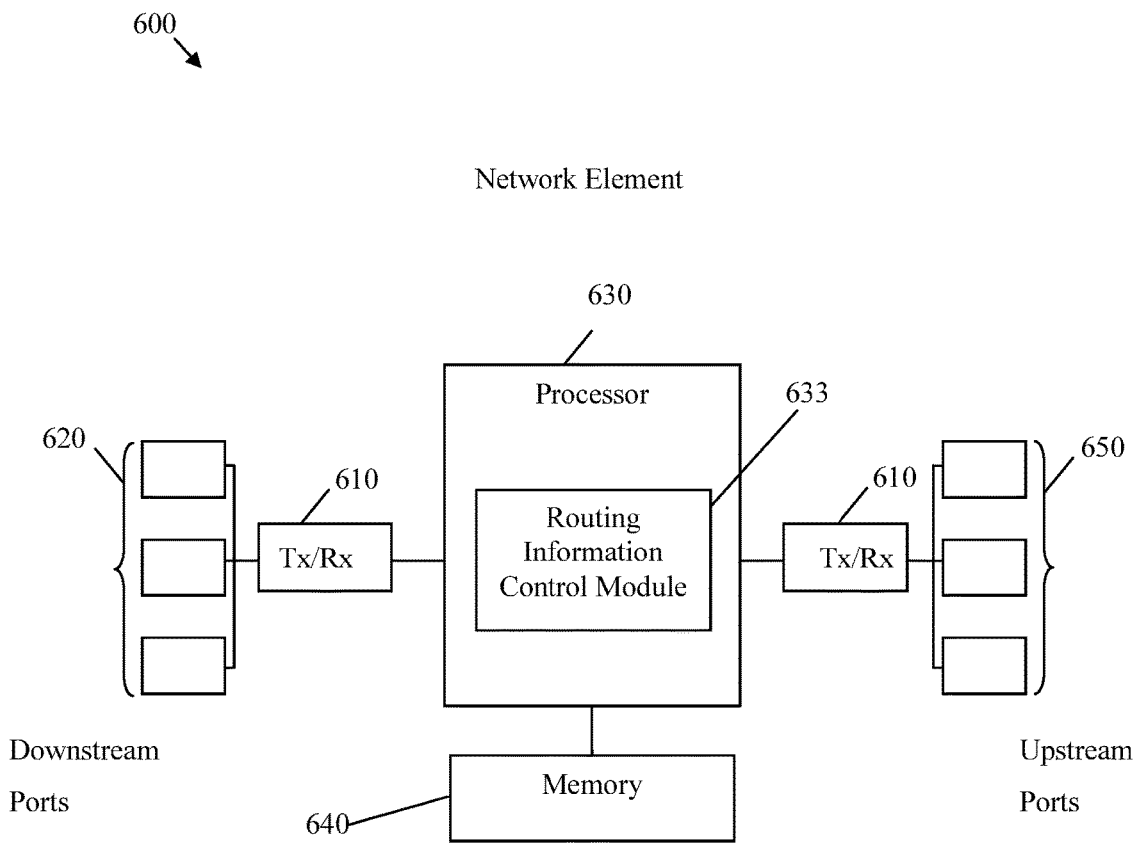
FIG. 6 is a schematic diagram of an NE according to an embodiment of the disclosure.

FIG. 6 is a schematic diagram of an NE 600 according to an embodiment of the disclosure. The NE 600 may act as a network switch or a border router, such as switches and routers in IXP members 112-116, or a server, such as the server 101, in an IXP network 110. The NE 600 may be configured to implement and/or support the routing information control schemes and IXP ORF schemes described herein. The NE 600 may be implemented in a single node or the functionality of NE 600 may be implemented in a plurality of nodes. One skilled in the art will recognize that the term NE encompasses a broad range of devices of which NE 600 is merely an example. The NE 600 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 600. For instance, the features and/or methods in the disclosure may be implemented using hardware, firmware, and/or software installed to run on hardware. As shown in FIG. 6, the NE 6000 may comprise transceivers (Tx/Rx) 610, which may be transmitters, receivers, or combinations thereof. A Tx/Rx 610 may be coupled to plurality of downstream ports 620 for transmitting and/or receiving frames from other nodes and a Tx/Rx 610 may be coupled to plurality of upstream ports 650 for transmitting and/or receiving frames from other nodes, respectively. A processor 630 may be coupled to the Tx/Rx 610 to process the frames and/or determine which nodes to send the frames to. The processor 630 may comprise one or more multi-core processors and/or memory devices 640, which may function as data stores, buffers, etc. Processor 630 may be implemented as a general processor or may be part of one or more application specific integrated circuits (ASICs) and/or digital signal processors (DSPs). Processor 630 may comprise an routing information control module 633, which may perform methods 100 and 500, and/or any other method discussed herein. In an alternative embodiment, the routing information control module 633 may be implemented as instructions stored in the memory devices 640, which may be executed by the processor 630. The memory device 640 may comprise a cache for temporarily storing content, e.g., a random-access memory (RAM). Additionally, the memory device 640 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the NE 600, at least one of the processor 630 and/or memory device 640 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Although the processes or methods are described above in terms of some sequential operations, it should be appreciated that some of the operations described may be performed in a different order. Moreover, some operations may be performed in parallel rather than sequentially.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for sending routing information in an Internet exchange point (IXP) network, comprising:
  receiving, by a server, first control information in a first message from a first IXP member via the IXP network, wherein the first control information comprises an identifier of a second IXP member, wherein the first IXP member is independent from the second IXP member, and wherein the identifier of the second IXP member uniquely identifies the second IXP member;
  obtaining, by the server, first routing information from the first IXP member via the IXP network;
  generating, by the server, second routing information based on the first routing information; and
  sending, by the server, the second routing information to the second IXP member based on the identifier of the second IXP member carried in the first message received from the first IXP member.

2. The method of claim 1, wherein the second routing information is identical to the first routing information.

3. The method of claim 1, wherein the control information includes an IP prefix associated with the first IXP member.

4. The method of claim 1, wherein the generating, by the server, the second routing information based on the first routing information comprises:
  determining a portion of the first routing information as the second routing information.

5. The method of claim 1, wherein the first control information comprises an identifier of a fourth IXP member.

6. The method of claim 5, the method comprising:
  generating fourth routing information for the fourth IXP member.

7. The method of claim 6, the method further comprising:
  sending the fourth routing information to the fourth IXP member based on the identifier of the fourth IXP member carried in the first message received from the first IXP member.

8. The method of claim 1, wherein the first control information is stored in an outbound route filtering (ORF) entry.

9. The method of claim 1, wherein the first routing information comprises: destination address information, next hop and Autonomous System (AS) path information.

10. The method of claim 1, wherein the first routing information is one route presenting one correspondence between destination address information and a next hop, rather than a plurality of routes.

11. A network node comprising:
  a memory storage comprising computer-executable instructions; and
  a processor coupled to the memory storage, wherein the processor is configured to execute the instructions to:
  receive first control information in a first message from a first IXP member via an IXP network, wherein the first control information comprises an identifier of a second IXP member, wherein the first IXP member is independent from the second IXP member, and wherein the identifier of the second IXP member uniquely identifies the second IXP member;
  obtain first routing information from the first IXP member via the IXP network;
  generate second routing information based on the first routing information; and
  send the second routing information to the second IXP member based on the identifier of the second IXP member carried in the first message received from the first IXP member.

12. The network node of claim 11, wherein the second routing information is identical to the first routing information.

13. The network node of claim 11, wherein the control information includes an IP prefix associated with the first IXP member.

14. The network node of claim 13, wherein the second routing information is a portion of the first routing information.

15. The network node of claim 11, wherein the first control information comprises an identifier of a fourth IXP member.

16. The network node of claim 15, wherein the processor is configured to execute the instructions to:
  generate fourth routing information for the fourth IXP member.

17. The network node of claim 16, wherein the processor is further configured to execute the instructions to:
  send the fourth routing information to the fourth IXP member based on the identifier of the fourth IXP member carried in the first message received from the first IXM member.

18. The network node of claim 11, wherein the first control information is stored in an outbound route filtering (ORF) entry.

19. The network node of claim 11, wherein the first routing information is one route presenting one correspondence between address information and a next hop, rather than a plurality of routes.

20. A non-transitory computer readable medium storing computer readable instructions causing a processor to:
  receive first control information in a first message from a first IXP member via an IXP network, wherein the first control information comprises an identifier of a second IXP member and wherein the identifier of the second IXP member uniquely identifies the second IXP member;
  obtain first routing information from the first IXP member via the IXP network;
  generate second routing information based on the first routing information; and
  send the second routing information to the second IXP member based on the identifier of the second IXP member carried in the first message received from the first IXP message, wherein the first IXP member is independent from the second IXP member.

* * * * *